(12) United States Patent
Hassani et al.

(10) Patent No.: US 10,583,699 B2
(45) Date of Patent: Mar. 10, 2020

(54) SYSTEMS AND METHODS FOR VEHICLE TPMS LOCALIZATION

(71) Applicant: Ford Global Technologies, LLC, Dearborn, MI (US)

(72) Inventors: Ali Hassani, Ann Arbor, MI (US); Dilip B. Patel, Novi, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/396,476

(22) Filed: Apr. 26, 2019

(65) Prior Publication Data
US 2019/0263198 A1 Aug. 29, 2019

Related U.S. Application Data

(63) Continuation of application No. 15/711,741, filed on Sep. 21, 2017, now Pat. No. 10,300,748.

(51) Int. Cl.
*H04B 17/27* (2015.01)
*B60C 23/04* (2006.01)
(Continued)

(52) U.S. Cl.
CPC ...... *B60C 23/0447* (2013.01); *B60C 23/0472* (2013.01); *B60C 23/0479* (2013.01);
(Continued)

(58) Field of Classification Search
CPC .............................. B60C 23/0447; H04W 4/80
See application file for complete search history.

(56) References Cited

U.S. PATENT DOCUMENTS

| 7,181,189 B2 | 2/2007 | Hotta |
| 7,271,711 B2 | 9/2007 | Daiss |

(Continued)

FOREIGN PATENT DOCUMENTS

| CN | 203126413 U | 8/2013 |
| CN | 203211119 U | 9/2013 |

(Continued)

OTHER PUBLICATIONS

BLE Type TPMS System, 2013, retrieved from http://www.cubelec.com.tw/ble-en.php on Jun. 23, 2017, 1 page.
Fobo Tire: World's First All Bluetooth Smart TPMS, 12 pages.

*Primary Examiner* — Tuan H Nguyen
(74) *Attorney, Agent, or Firm* — Frank Lollo; Eversheds Sutherland (US) LLP (57) ABSTRACT

Method and apparatus are disclosed for localizing vehicle TPMS sensors. An example vehicle includes a plurality of TPMS sensors, a communication module, and a processor. The processor is configured for receiving, from a mobile device communicatively coupled to the communication module, a localization request comprising a tire location. The processor is also configured for transmitting wakeup requests to the plurality of TPMS sensors. And the processor is further configured for, responsive to determining signal strength values between each of the plurality of TPMS sensors and the mobile device, associating a selected TPMS sensor with the tire location.

15 Claims, 4 Drawing Sheets

(51) Int. Cl.
*H04B 17/318* (2015.01)
*H04W 4/80* (2018.01)
*H04W 4/38* (2018.01)

(52) U.S. Cl.
CPC ........... *H04B 17/27* (2015.01); *H04B 17/318* (2015.01); *H04W 4/80* (2018.02); *H04W 4/38* (2018.02)

(56) References Cited

U.S. PATENT DOCUMENTS

| | | |
|---|---|---|
| 7,994,904 B2 | 8/2011 | Kim |
| 8,421,612 B2 * | 4/2013 | Sugiura ............... B60C 23/0433 340/442 |
| 9,399,376 B2 | 7/2016 | Lickfelt |
| 9,469,166 B2 | 10/2016 | McIntyre |
| 2011/0304442 A1 | 12/2011 | Lickfelt |
| 2014/0330449 A1 * | 11/2014 | Oman ................... G01S 13/765 701/2 |

FOREIGN PATENT DOCUMENTS

| | | |
|---|---|---|
| CN | 203472438 U | 3/2014 |
| DE | 102015105885 A1 | 10/2016 |
| IN | 3787DEL2014 A1 | 8/2016 |
| JP | 2006127014 A | 5/2006 |
| JP | 2013082381 A | 5/2013 |
| WO | WO 2016/198970 A1 | 12/2016 |

* cited by examiner

SYSTEMS AND METHODS FOR VEHICLE TPMS LOCALIZATION

CROSS-REFERENCE TO RELATED APPLICATIONS

This application is a continuation of U.S. patent application Ser. No. 15/711,741 filed Sep. 21, 2017, which is herein incorporated by reference in its entirety.

TECHNICAL FIELD

The present disclosure generally relates to vehicles with tire pressure monitoring system (TPMS) sensors and, more specifically, systems and methods for vehicle TPMS sensor localization.

BACKGROUND

Vehicles have a tire pressure monitoring system (TPMS) with sensors monitoring each tire. The TPMS sensors measure the pressure of the corresponding vehicle tire, and may transmit the measured pressure to the vehicle for display to a driver. The TPMS sensors are located on the interior of the tire rim, and may transmit information at a slow rate to conserve battery life. Each TPMS sensor may provide information about the tire pressure which can be used to determine the corresponding location of the tire. When tires are rotated or changed entirely, the TPMS sensors may no longer correspond to their previous positions on the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for localizing TPMS sensors of a vehicle. An example disclosed vehicle includes a plurality of tire pressure sensors, a communication module, and a processor. The processor is configured for receiving, from a mobile device communicatively coupled to the communication module, a localization request comprising a tire location. The processor is also configured for transmitting wakeup requests to the plurality of tire pressure sensors. And the processor is further configured for, responsive to determining signal strength values between each of the plurality of tire pressure sensors and the mobile device, associating a selected tire pressure sensor with the tire location.

An example disclosed method for vehicle tire localization includes transmitting, by a mobile device, a localization request comprising a tire location, wherein the localization request causes transmission of wakeup requests to a plurality of tire pressure sensors. The method also includes determining signal strength values of respective signals between the plurality of tire pressure sensors and the mobile device. And the method further includes associating a selected tire pressure sensor with the tire location based on a strongest signal strength value.

A third example may include means for transmitting a localization request comprising a tire location, wherein the localization request causes transmission of wakeup requests to a plurality of tire pressure sensors. The example may also include means for determining signal strength values of respective signals between the plurality of tire pressure sensors and a mobile device. And the example may further include means for associating a selected tire pressure sensor with the tire location based on a strongest signal strength value.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, each tire of a vehicle may include a TPMS sensor. The TPMS sensors may provide the latest tire pressure values of the respective tires. However, the latest tire pressure values may not reflect up to the minute values, and in some cases may be minutes or even hours old. For instance, TPMS sensors may be configured to provide a tire pressure value once every six hours when the tire is stationary, and once every minute while the tire is rotating.

A driver may wish to know the current tire pressure of a given tire for several reasons. In some cases, the driver may wish to know about changes in tire pressure that occur on a scale faster than the rate with which the TPMS sensors provide information. Where there is a small leak, a six hour gap may result in a large change in tire pressure. Further, if a driver returns to a vehicle before the six hour time window has elapsed, any changes in tire pressure will not be reflected. In this case, the driver may start the vehicle and begin driving without realizing that a leak has caused a tire to go flat or could go flat during the driving event.

Further issues may arise where the tires are rotated, swapped, or otherwise change positions. In these cases, there may be a benefit to providing a real-time or near real-time tire pressure value, in addition to localization of the tires. Some vehicles may localize tires by measuring differences in wheel rotation while the vehicle is in motion. But in requiring motion, the vehicles may not be able to provide up to date localization on an immediate or on-demand basis. Immediate or on-demand localization may also be beneficial for vehicles having multiple wheels on the same side of an axle (e.g., large trucks, trailers, etc.). The difference in wheel rotation here may be too small to provide accurate measurements. With these issues in mind, example embodiments disclosed herein may attempt to solve or alleviate some of the problems without relatively large time delays and/or the need to put the car in motion.

Figure 1:
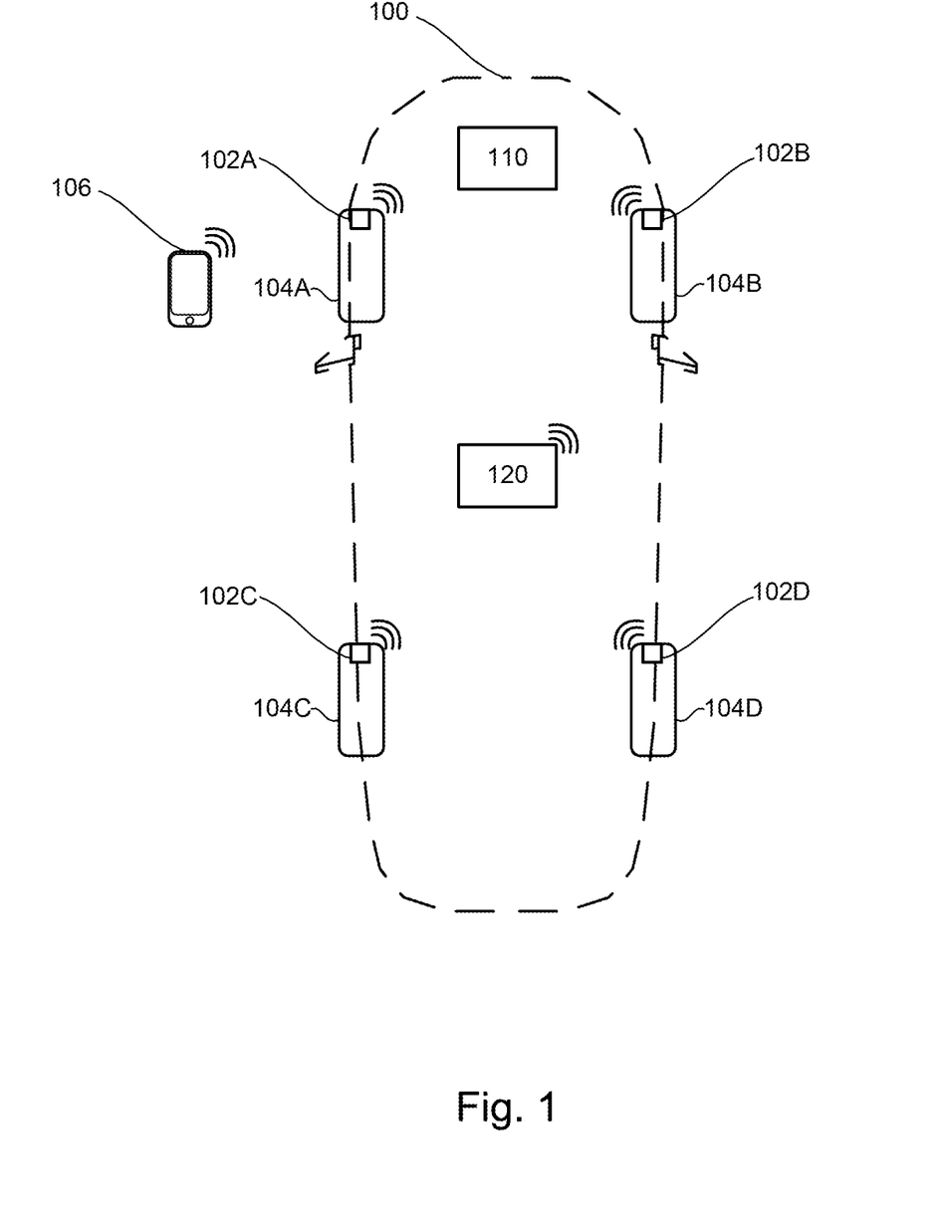
FIG. 1 illustrates an example vehicle according to embodiments of the present disclosure.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 3).

As shown in FIG. 1, vehicle 100 may include a plurality of tires 104A-D each having a corresponding TPMS sensor 102A-D. Vehicle 100 may also include a processor 110, and a communication module 120. One or more other electronic elements of vehicle 100 may be described in further detail with respect to FIG. 3.

TPMS sensors 102A-D may include circuitry configured to determine a tire pressure of a corresponding tire 104A-D. TPMS sensors 102A-D may also include circuitry to facilitate communication with one or more devices or systems, such as communication module 120 of vehicle 100 and/or mobile device 106. This communication may be done using any wireless protocol, including low frequency signals, BLUETOOTH signals, and others. Each communication signal may have a corresponding signal strength value, angle of arrival value, time of flight value, or other characteristic. The signal strength may also be called a received signal strength indication (RSSI). The RSSI may be measured by the TPMS sensors 102A-D themselves, the communication module 120, the mobile device 106, and/or one or more other devices or systems of vehicle 100.

In some examples, TPMS sensors 102A-D may determine one or more signal characteristics (such as the RSSI value) between the respective TPMS sensors and the mobile device 106. This information may then be transmitted to communication module 120 and/or one or more other devices or systems of vehicle 100.

Communication module 120 may be configured to communicate with one or more devices or systems of vehicle 100, as well as one or more remote devices or systems such as mobile device 106. Communication module 120 may include circuitry and/or components such that it may communicate via any wireless communication protocol, including low frequency, high frequency, BLUETOOTH, and others.

Communication module 120 may include one or more antennas. The antenna(s) individually and/or in combination may be configured to, among other things, (i) transmit and receive data from the plurality of tire pressure sensors, and (ii) determine RSSI values, angles of arrival, time of flight, other data corresponding to signals from one or more devices or systems. In some examples, communication module 120 may receive RSSI, angle of arrival, time of flight, or other signal data from TPMS sensors 102A-D and/or mobile device 106.

In some examples, signal data (RSSI, angle of arrival, time of flight, etc.) may be determined upon starting or turning on vehicle 100. Alternatively, signal data can be determined based on a request received from mobile device 106, or at a predetermined interval (e.g., once per hour, day, etc.).

If the determined signal data does not match or is not within a threshold of prior values, one or more action may be taken. For instance, actions may include providing an alert indicating that tire values are out of specification or different than expected (e.g., via a display in vehicle, transmitted to mobile device, etc). Further, determining that the values do not match prior values can trigger or initiate the process of localization of the tires 104A-D.

In some examples, determining that the measured values do not match may include determining current signal strength values between the vehicle antenna or communication module and the plurality of tire pressure sensors. It may then include determining that one or more current signal strength values is different from a historic signal strength value by a threshold amount (e.g., 5-10% different). The example may then include responsively transmitting a message to mobile device 106 requesting a localization or re-localization of one or more of the plurality of TPMS sensors.

Mobile device 106 may be any portable electronic device configured to transmit and/or receive data with TPMS sensors 102A-D and communication module 120. Mobile device 106 may be configured to pair with one or more TPMS sensors using a BLUETOOTH connection. Other protocols or types of connections are possible as well.

In some examples, mobile device 106 may determine or measure an RSSI, angle of arrival, time of flight, or other signal metric corresponding to signals between TPMS sensors 102A-D and mobile device 106, and/or between mobile device 106 and communication module 120.

In some examples, the angle of arrival of a given signal from a TPMS sensor such as TPMS sensor 102A to communication module 120 should be similar to the angle of arrival of a signal between mobile device 106 and communication module 120, given that mobile device 106 is located proximate to TPMS sensor 102A. This similarity may be used to localize TPMS sensor 102A in combination with an input via mobile device 106 indicating that it has been placed nearby or proximate to tire 104A and/or TPMS sensor 102A. Where the angle of arrival differs significantly, that may be an indication that the mobile device is not located proximate the TPMS sensor.

Processor 110 may be configured to carry out one or more actions or steps disclosed herein. For instance, processor 110 may be configured to determine current signal strength values, angles of arrival, time of flight, or other signal metrics between each TPMS sensor 102A-D and communication module 120, mobile device 106, and/or one or more other devices or systems.

Processor 110 may also compare the determined signal metrics or values to historic values, past values, and/or threshold values. If the measured values differ by greater than a threshold amount, processor 110 may initiate a localization procedure. This can include providing an alert via a vehicle display, transmitting a message to the mobile device indicating a request to localize or re-localize the TPMS sensors and tires, or some other action.

To localize the tires and/or TPMS sensors, processor 110 may be configured for receiving, from mobile device 106 via communication module 120, a localization request comprising a tire location. This configuration may be done by Low Frequency antenna. The localization request can be transmitted without prompting from processor 110 (i.e., it can be initiated by a user rather than the vehicle), or can be based on a determination that one or more tires have been rotated, swapped, or otherwise have changed position. Further, the localization request can be transmitted responsive to determining that measured signal data (e.g., RSSI, angle of arrival, and time of flight) differs from historic or past values by a threshold amount.

In some examples, the localization request may comprise a tire location, such as a left front, right front, left rear inside, left rear outside, etc. Mobile device 106 may provide a user interface for selection of the tire location by a user, including radio buttons, a drop down menu, a visual display (i.e., touch screen selection of a particular tire on an image of a vehicle), or more. Further, the localization request may include a sequence of tire locations rather than a single tire location (i.e., start with left front tire 104A and continue clockwise to right front 104B, right rear 104D, and left rear 104C). The user may then traverse to each sensor, in sequence, and acknowledge that the correct sensor is paired to the phone based on the location.

Responsive to receiving the localization request from mobile device 106, the processor may transmit wakeup requests to one or more of the TPMS sensors 102A-D. For example, wakeup requests may be sent via a Bluetooth low energy (BLE) antenna, Low Frequency antenna, or a Medium Frequency antenna. In some examples, wakeup requests may be sent to all TPMS sensors. Alternatively, wakeup requests may be sent to a subset of TPMS sensors. The subset may be based on the tire location received from the mobile device via a user input (e.g., receiving left front may correspond to sending a wakeup request only to the TPMS sensor previously stored as left front). In some cases, a wakeup request may be sent to both front wheels, both left TPMS sensors, or some other subset. The wakeup request may comprise an instruction to the TPMS sensor to exit a battery saving or low power mode, and begin attempting to pair with one or more devices.

Processor 110 may also be configured to determine the RSSI values, angle of arrival, and/or time of flight between the TPMS sensors and the mobile device, between the TPMS sensors and the communication module, and between the communication module and the mobile device.

Processor 110 may also transmit a message to the mobile device indicating a request for a user of the mobile device to place the mobile device near the TPMS sensor corresponding to the received location. For instance, if the processor receives a localization request with an indication of the front left tire, processor 110 may transmit a request for the user to place the mobile device near the front left TPMS sensor or tire of the vehicle.

Mobile device 106 may be configured to pair with one or more of the TPMS sensors, either before or after the wakeup request has been sent by the processor. In some examples, mobile device 106 may pair with the TPMS sensors comprising the subset of TPMS sensors to which a wakeup request was sent (e.g., the left side TPMS sensors or front TPMS sensors).

RSSI, angle of arrival, and/or time of flight values of signals between the mobile device and the paired TPMS sensors may then be determined. Examples herein may be described with reference to an RSSI value, however it should be noted that angle of arrival and time of flight determinations may be used instead of or in addition to RSSI values. An RSSI value between the front left TPMS sensor and the mobile device may be the strongest signal (due to the close proximity). The processor may associate a selected TPMS sensor (i.e., TPMS sensor 102A) having the strongest RSSI value with the tire location provided in the localization request.

In some examples, once this association has been made, the processor may transmit a message to the mobile device requesting the user move to a second tire, and place the mobile device near the TPMS sensor of the second tire. One or more parts of the process described above may be repeated until all tires of the vehicle are localized and have an associated TPMS sensor.

Figure 2:
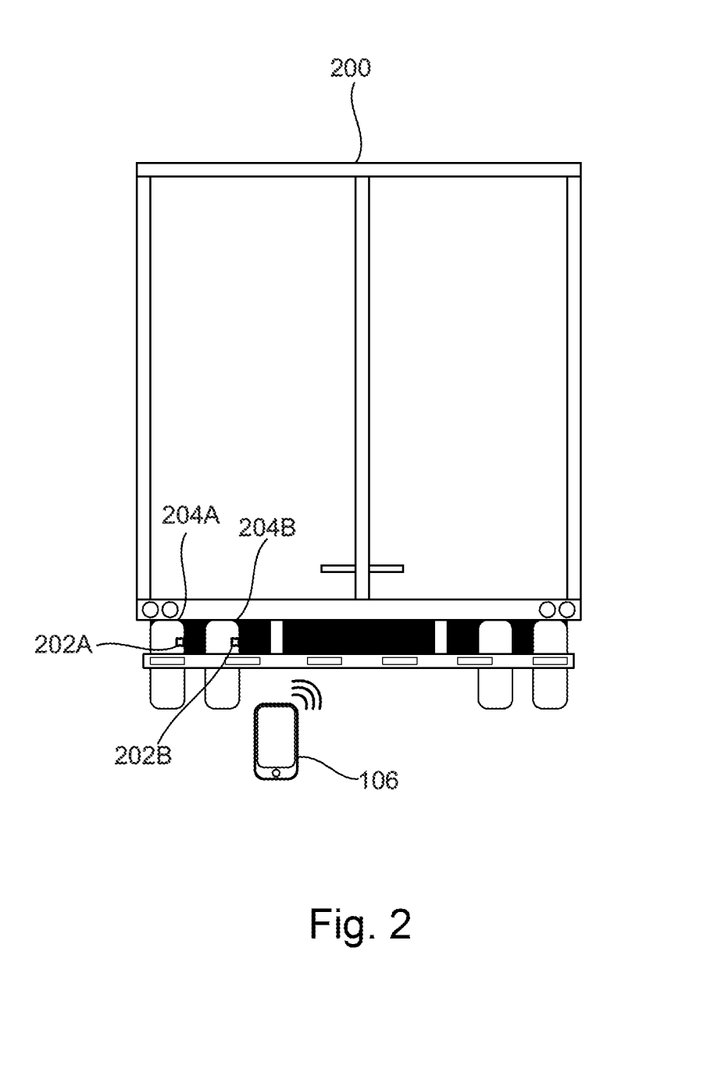
FIG. 2 illustrates a rear perspective view of an example vehicle according to embodiments of the present disclosure.

FIG. 2 illustrates an example vehicle 200, which may be similar or identical to vehicle 100 in some respects. For example, vehicle 200 may include TPMS sensors 202A-B corresponding to a tires 204A-B. The TPMS sensors may be communicatively coupled to a vehicle processor, and may be configured to pair with mobile device 106.

FIG. 2 illustrates a scenario in which two tires 204A-B and TPMS sensors 202A-B are disposed on the same side of an axle. A first TPMS sensor 202A and a second TPMS sensor 202B may correspond respectively to an outer tire 204A and an inner tire 204B positioned on the same side of a vehicle axle. Ordinarily it may be difficult for a communication module to differentiate between signals from the TPMS sensors, especially if the tires have been rotated or switched, or if the tires correspond to a trailer of the vehicle which has only recently been attached.

In order to localize tires 204A-B to associate a given TPMS sensor with the correct tire, examples disclosed herein may include receiving, from mobile device 106, a localization request comprising a tire location corresponding to a first tire (e.g., inner tire 204B). The vehicle processor may then transmit a wakeup request to both TPMS sensors 202A and 202B. It may be hard to differentiate between the TPMS sensors based on location alone.

TPMS sensors 202A-B may then begin pairing with mobile device 106, and the RSSI, angle of arrival, and/or time of flight data for signals between mobile device 106 and TPMS sensors 202A and 202B respectively may be determined. When mobile device is placed proximate inner tire 204B, the signal from TPMS sensor 202B will be stronger than the signal from TPMS sensor 202A. TPMS sensor 202B may then be associated with the inner tire 204B. This process may be repeated for other tires as well.

Figure 3:
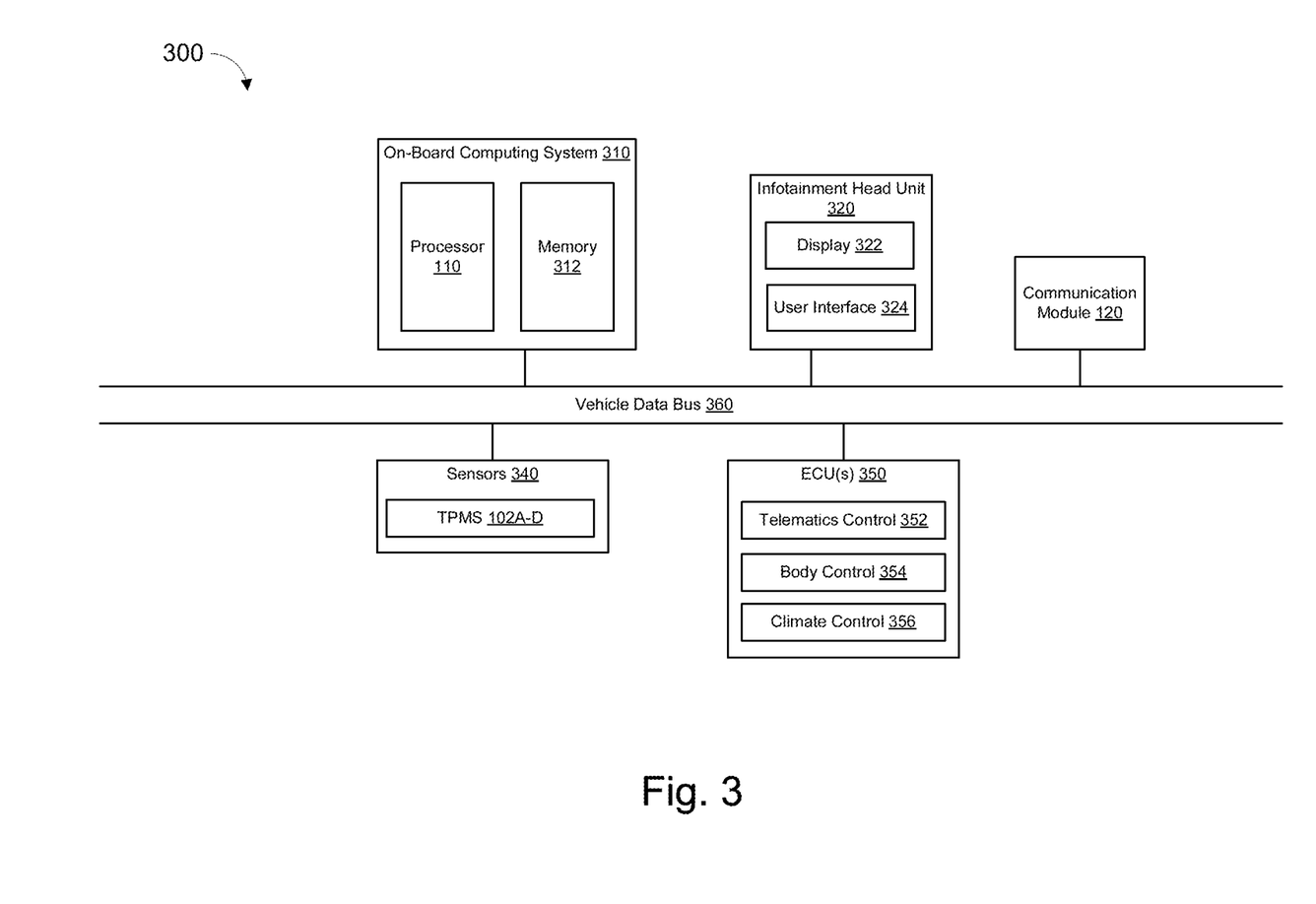
FIG. 3 illustrates an example block diagram of electronic components of the vehicles of FIG. 1 and/or FIG. 2.

FIG. 3 illustrates an example block diagram 300 showing electronic components of vehicles 100 and/or 200, according to some embodiments. In the illustrated example, the electronic components 300 include the on-board computing system 310, infotainment head unit 320, communication module 120, sensors 340, electronic control unit(s) 350, and vehicle data bus 360.

The on-board computing system 310 may include a microcontroller unit, controller or processor 110 and memory 312. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 320 may provide an interface between vehicle 100 and/or 200 and a user. The infotainment head unit 320 may include one or more input and/or output devices, such as display 322, and user interface 324. User interface 324 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 320 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with on-board computing system 310. Additionally, the infotainment head unit 320 may display the infotainment system on, for example, a display 322 of vehicle 100.

Sensors 340 may be arranged in and around the vehicle 100 in any suitable fashion. In the illustrated example, sensors 340 include TPMS sensors 102A-D. Other sensors may be included as well.

The ECUs 350 may monitor and control subsystems of vehicle 100. ECUs 350 may communicate and exchange information via vehicle data bus 360. Additionally, ECUs 350 may communicate properties (such as, status of the ECU 350, sensor readings, control state, error and diagnostic codes, etc.) to and/or receive requests from other ECUs 350. Some vehicles 100 may have seventy or more ECUs 350 located in various locations around the vehicle 100 communicatively coupled by vehicle data bus 360. ECUs 350 may be discrete sets of electronics that include their own circuit(s) (such as integrated circuits, microprocessors, memory, storage, etc.) and firmware, sensors, actuators, and/or mounting hardware. In the illustrated example, ECUs 350 may include the telematics control unit 352, the body control unit 354, and the climate control unit 356.

The telematics control unit 352 may control tracking of the vehicle 100, for example, using data received by a GPS receiver, communication module 120, and/or one or more sensors. The body control unit 354 may control various subsystems of the vehicle 100. For example, the body control unit 354 may control power a trunk latch, windows, power locks, power moon roof control, an immobilizer system, and/or power mirrors, etc. The climate control unit 356 may control the speed, temperature, and volume of air coming out of one or more vents. The climate control unit 356 may also detect the blower speed (and other signals) and transmit to the on-board computing system 310 via data bus 360. Other ECUs are possible as well.

Vehicle data bus 360 may include one or more data buses that communicatively couple the on-board computing system 310, infotainment head unit 320, communication module 120, sensors 340, ECUs 350, and other devices or systems connected to the vehicle data bus 360. In some examples, vehicle data bus 360 may be implemented in accordance with the controller area network (CAN) bus protocol as defined by International Standards Organization (ISO) 11898-1. Alternatively, in some examples, vehicle data bus 360 may be a Media Oriented Systems Transport (MOST) bus, or a CAN flexible data (CAN-FD) bus (ISO 11898-7). In some examples, the CAN bus may be shared with the CAN-FD bus.

Figure 4:
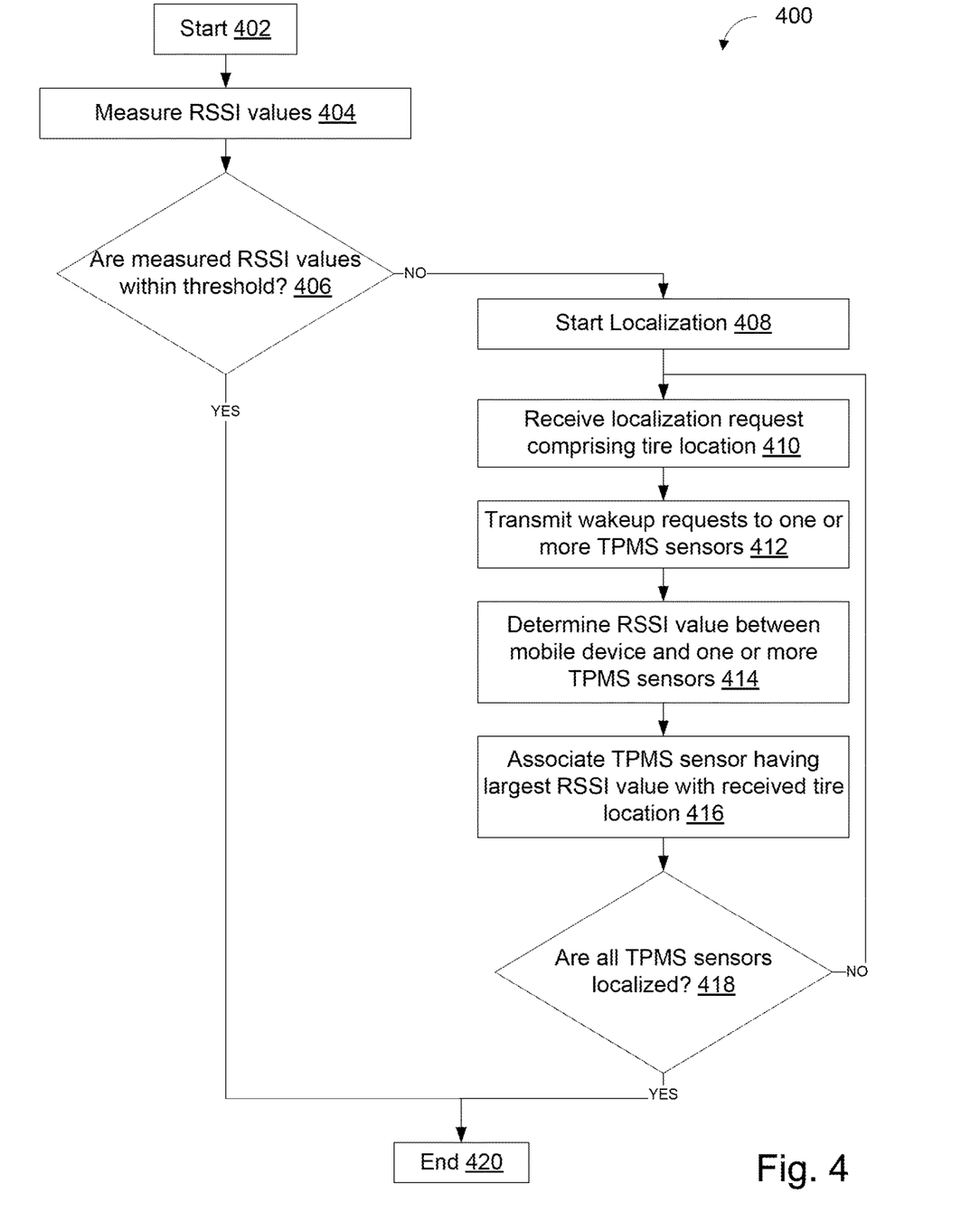
FIG. 4 illustrates a flowchart of an example method according to embodiments of the present disclosure.

FIG. 4 illustrates a flowchart of an example method 400 according to embodiments of the present disclosure. Method 400 may allow one or more TPMS sensors to be localized to corresponding vehicle tires. The flowchart of FIG. 4 is representative of machine readable instructions that are stored in memory (such as memory 312) and may include one or more programs which, when executed by a processor (such as processor 110) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include measuring RSSI values between one or more TPMS sensors and a communication module of the vehicle. In addition, block 404 may include measuring or determining one or more other characteristics of signals between the TPMS sensors and the communication module.

At block 406, method 400 may include determining whether the measured RSSI values are within a threshold. This may include comparing the measured values to historic or past values, or to a threshold value. The threshold, historic, or past values may be expected RSSI values based on previous locations of one or more TPMS sensors. For instance, the RSSI values of the TPMS sensors may be stored. When the vehicle is turned off and back on, the stored RSSI values may be compared to current measurements. Where one or more TPMS sensors have been replaced or moved, the RSSI values will be different. A threshold difference may be used to allow for small changes and variations.

If the RSSI values (or other signal metrics) are within the threshold, method 400 may end at block 420. This may be the case where all TPMS sensors are properly localized and have not changed positions.

Alternatively, if the measured RSSI values are not within the threshold, that may indicate that one or more TPMS sensors have moved. For instance, an RSSI value for a front left TPMS sensor may be stored. If the front left tire is moved, when the RSSI value is measured it will be different from the prior or expected RSSI value. In this instance, method 400 may proceed to block 408 in which the processor localization is started.

At block 410, method 400 may include receiving a localization request comprising a tire location. The localization request may be transmitted by a mobile device or low frequency antenna, and the tire location may be the location of a tire that a user wishes to match, pair, or localize (e.g., front left, front right, back left inner, back left outer, etc.).

At block 412, method 400 may include transmitting a wakeup request to one or more TPMS sensors. This may include determining one or more TPMS sensors based on the received localization request and/or tire location. For instance, where the received tire location is a front left tire, a wakeup request may be transmitted to TPMS sensors that are expected to correspond to both front tires, both left tires, or another subset of the vehicle tires.

Each TPMS sensor may have a corresponding code or ID. When a wakeup request is transmitted, it may be transmitted based on the TPMS sensor ID. As such, when a localization request is received from a mobile device with an indication of the front left tire, a wakeup request may be transmitted to the TPMS sensor having the ID that was previously in the left front tire position. As such, if the left front tire has been rotated to the left rear, the wakeup request may be transmitted to the rear.

Alternatively, the wakeup request may be broadcast to an area of the vehicle. For instance, where the localization request is for the left front tire, a centralized communication module may transmit a wakeup request over a broad area that include the front left tire, as well as the front right tire, and/or another vehicle tire. This request may be transmitted via low frequency or Bluetooth low energy antenna.

At block 414, method 400 may include determining RSSI values between the mobile device and one or more TPMS sensors, such as the TPMS sensors to which a wakeup request was sent at block 412. The RSSI values may be determined by the TPMS sensors themselves or by the mobile device. In some examples, the RSSI values may be transmitted to the vehicle and processed by the vehicle processor.

At block 416, method 400 may include associating a select TPMS sensor having the largest RSSI value with the received tire location. When the localization request is received with a corresponding tire location, a user may place the mobile device proximate the tire location. As such, when a user requests a localization of the left front tire, he or she may place the mobile device near the left front tire. When the RSSI values are determined between the vehicle TPMS sensors and the mobile device, the TPMS sensor corresponding to the left front tire will have the strongest or highest RSSI value. And based on the relative strength of the connection between the mobile device and one or more TPMS sensors, the left front TPMS sensor may be associated with the left front tire.

At block 418, method 400 may include determining whether all TPMS sensors have been localized. If all TPMS sensors do not have a corresponding location, method 400 may return to block 410 and repeat steps 410-416 for each tire and TPMS sensor. However if all TPMS sensors have been localized, method 400 may end at block 420.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A vehicle comprising:
   TPMS sensors;
   a communication module; and
   a processor to:
   receive, via the communication module, a localization request for a tire location from a mobile device near the tire location;
   wake up the TPMS sensors to pair with the mobile device;
   determine time of flight values of communication between the TPMS sensors and the mobile device;
   identify which of the TPMS sensors is at the tire location based on the time of flight values; and
   wherein, to identify which of the TPMS sensors is at the tire location, the processor determines which of the TPMS sensors corresponds with a shortest of the time of flight values.

2. The vehicle of claim 1, wherein, to wake up the TPMS sensors, the processor transmits wakeup requests to the TPMS sensors via the communication module.

3. The vehicle of claim 2, wherein, to transmit the wakeup requests, the processor is to:
   determine a subset of the TPMS sensors based on the tire location; and
   transmit the wakeup requests to the subset of the TPMS sensors.

4. The vehicle of claim 2, wherein the communication module transmits the wakeup requests via a Bluetooth Low Energy (BLE) antenna.

5. The vehicle of claim 2, wherein the communication module transmits the wakeup requests via a low frequency antenna.

6. The vehicle of claim 1, wherein the TPMS sensors include a first TPMS sensor and a second TPMS sensor corresponding respectively to an inner tire and an outer tire positioned on the same side of a vehicle axle, wherein, when the mobile device is nearest to the inner tire, the processor is to:

wake up the first and second TPMS sensors;
determine a first time of flight value between the first TPMS sensor and the mobile device and a second time of flight value between the second TPMS sensor and the mobile device;
determine that the second time of flight value is greater than the first time of flight value; and
responsively identify that the inner tire includes the first TPMS sensor.

7. A method for a vehicle, comprising:
receiving, via a communication module, a localization request for a tire location from a mobile device near the tire location;
waking up TPMS sensors upon receiving the localization request;
determining, via a processor, time of flight values of communication between the TPMS sensors and the mobile device;
identifying, via the processor, which one of the TPMS sensors is at the tire location based on the time of flight values; and
wherein to identify which of the TPMS sensors is at the tire location, determining which of the TPMS sensors corresponds to a lowest of the time of flight values.

8. The method of claim 7, wherein waking up the TPMS sensors includes transmitting wakeup requests to the TPMS sensors via the communication module.

9. The method of claim 8, further comprising determining a subset of the TPMS sensors based on the tire location, wherein the wakeup requests are transmitted to the subset of the TPMS sensors.

10. The method of claim 7, further comprising causing the TPMS sensors to pair with the mobile device for communication upon waking up the TPMS sensors.

11. A vehicle comprising:
TPMS sensors;
a communication module;
a processor to:
receive, via the communication module, a localization request for a tire location from a mobile device near the tire location;
wake up the TPMS sensors to pair with the mobile device;
determine time of flight values of communication between the TPMS sensors and the mobile device;
identify which of the TPMS sensors is at the tire location based on the time of flight values; and
wherein the TPMS sensors include a first TPMS sensor and a second TPMS sensor corresponding respectively to an inner tire and an outer tire positioned on the same side of a vehicle axle, wherein, when the mobile device is nearest to the inner tire, the processor is to:
wake up the first and second TPMS sensors;
determine a first time of flight value between the first TPMS sensor and the mobile device and a second time of flight value between the second TPMS sensor and the mobile device;
determine that the second time of flight value is greater than the first time of flight value; and
responsively identify that the inner tire includes the first TPMS sensor.

12. The vehicle of claim 11, wherein, to wake up the TPMS sensors, the processor transmits wakeup requests to the TPMS sensors via the communication module.

13. The vehicle of claim 12, wherein, to transmit the wakeup requests, the processor is to:
determine a subset of the TPMS sensors based on the tire location; and
transmit the wakeup requests to the subset of the TPMS sensors.

14. The vehicle of claim 12, wherein the communication module transmits the wakeup requests via a Bluetooth Low Energy (BLE) antenna.

15. The vehicle of claim 12, wherein the communication module transmits the wakeup requests via a low frequency antenna.

* * * * *